United States Patent Office 3,577,555
Patented May 4, 1971

3,577,555
CARBON BLACK IN PAPER COATING LATEX
Robert A. Forrester and Ralph E. McNay, Houston, Tex., assignors to Ashland Oil, Inc., Houston, Tex.
No Drawing. Filed June 22, 1966, Ser. No. 559,423
Int. Cl. C08d 7/00
U.S. Cl. 260—17.4          8 Claims

ABSTRACT OF THE DISCLOSURE

Stable aqueous slurries of carbon black and latexes of polymers of ethylenically unsaturated monomers, especially diene polymers, are prepared by adding a dispersing agent prepared by mixing a water soluble natural gum with an anionic surface active agent to the polymer latex, and then adding dry carbon black. The amount of dispersing agent is selected to be sufficient to stabilize the latex against the destabilizing effect of the carbon black. Stable latex slurries can be prepared at 30–60% latex polymer and an amount of carbon black equal to or greater than the latex polymer content.

---

The present invention relates to a method of preparing carbon black-latex mixtures, a method of coating a substrate and the products thereof. More specifically, the present invention relates to a method of forming aqueous carbon black-latex slurries, a method of coating a substrate therewith and the coated products thereof.

It is known in the prior art to prepare carbon black-latex mixtures for various purposes, such as the coating of substrates, such as paper. While numerous methods of applying carbon black-latex coatings to substrates are known, it is obvious that the most desirable techniques involve the application of the mixture as a liquid or slurry followed by drying to remove the carrier vehicle. This permits application of the coating to the substrate by means of a trailing blade, an air knife, or other appropriate techniques. It is also most desirable to utilize water as the carrier vehicle. Unfortunately, prior art methods of dispersing carbon black and latex as an aqueous slurry are seriously lacking due to the instability of such dispersions as well as the non-uniformity of the mixture. The instability is the result of the inherent tendency of the latex to coagulate or separate from the slurry either on standing for extended periods of time or due to mechanical shear. The ultimate result is therefore that, upon standing for any length of time, these aqueous slurries become too viscous to be handled by conventional coating equipment. The non-uniformity, either present because of lack of suitable dispersion or because of inherent coagulation or separation, also results in a non-uniform coating being applied to the substrate. The lack of proper initial mixing or dispersion is to a certain extent related to the fact that the materials will not withstand substantial amounts of mechanical shearing. Therefore, there is a tendency to prepare such mixtures with a minimum amount of mixing; and, as a result, inadequate mixing results and a non-uniform dispersion is produced. Also, as indicated, the inherent tendency of the materials to coagulate or separate causes non-uniformity of the product mixture. Accordingly, when the non-uniform mixture is applied as a coating or film on a substrate, the undispersed carbon black or lumps of carbon black or agglomerated or coagulated latex result in uneven coatings, non-uniform coating thicknesses and/or fine cracks or "alligatoring" in the coatings.

Because of the above difficulties, it has been the general practice, in the art of preparing carbon black-latex mixtures and the coating of a substrate therewith, to prepare the dispersion or slurry and immediately apply it to the substrate. While this approach overcomes the problem of the tendency of the materials to agglomerate and/or separate upon standing, it does not solve the problems of non-uniformity caused by insufficient dispersion or mixing and it does not overcome the inherent problem of high initial viscosity. By the same token, it adds to the problems of the paper processor in that the carbon black must be shipped in dry form, handled and stored in dry form and mixed in situ by the paper processor. It would therefore be particularly advantageous, if the carbon black could be transported to the paper treating operation in a fluid or slurry form and utilized in that form. It would be a still further advantage, if the entire coating composition could be prepared by the carbon black manufacturer or at the site of carbon black manufacture and, thereafter, shipped to the paper treating plant for application without further modification or treatment.

Prior to the present invention an attempt was made to prepare a pre-formed dispersion or slurry of carbon black and latex. This approach involved preparation of a dispersion or slurry of carbon black in an aqueous medium and the addition of this slurry of carbon black to the latex. While this approach substantially overcame the problem of undispersed carbon black in the composition, the dispersion, even when utilizing appropriate dispersing agents, was found to lack stability upon standing or on working and separation of the components occurred. In addition, the slurry of carbon black-latex became too viscous for coating purposes unless used very shortly after preparation. Accordingly, this did not offer a complete answer to the problem, since it was still necessary to prepare carbon black-latex mixtures at the paper coating plant and, therefore, to handle all of the materials individually.

Experimentation to find a solution to these problems has also shown that carbon black exhibits problems not encountered in dealing with other finely divided materials or the so-called "pigments, fillers and extenders," such as, zinc oxide, clay and the like. While pigments, fillers, extenders and other inert solid materials produce a slurry or suspension whose viscosity generally varies directly in accordance with the amount of material added, carbon black suspensions have a tendency to become thixotropic when subjected to mechanical shear.

In addition to the above, the provision of latex-bound carbon black coatings having a high concentration of carbon black and a high total solids content is highly desirable in the paper coating field for several reasons. In the production of coated papers for use as a light block in photographic work, for use as an opaque undercoating for thermographic or electrographic recording papers and for numerous other purposes dictates that the carbon black coating be as even as is possible and also as dense or dark as possible. Further, a carbon black-latex coating mixture having a high solids content makes it possible to substantially reduce the problems of applying the coating and removing the carrier liquid from the coating after the coating process has been performed.

While the previously-mentioned difficulties are present when utilizing small conventional amounts of carbon black and when forming slurries having relatively low total solids contents, these problems are compounded astronomically when efforts are made to add large amounts of carbon black.

It is therefore a principal object of the present invention to fulfill the aforementioned needs. It is a further object of the present invention to provide an improved method for preparing an aqueous slurry of carbon black and latex. A further object of the present invention is to provide an improved method for preparing an aqueous carbon black-latex coating composition. A still further object of the present invention is to provide an improved method for preparing an aqueous carbon black-latex slurry of excellent stability. Another and further object of the present invention is to provide an improved method for preparing a carbon black-latex slurry of improved viscosity and ease of handling. A further object of the present invention is to provide an improved method for preparing a carbon black-latex slurry which is highly stable during storage and handling. A still further object of the present invention is to provide an improved carbon black-latex slurry. Yet another object of the present invention is to provide an improved aqueous carbon black-latex coating composition. Still another object of the present invention is to provide an improved coated substrate having a high loading of carbon black. Another object of the present invention is to provide an improved coated substrate having a high concentration of carbon black in a latex binder. Another and further object of the present invention is to provide an improved coated substrate having a high concentration of carbon black in a latex binder, which is uniform and free of cracks or other surface blemishes.

It has been surprisingly and unexpectedly discovered that the above objectives can be accomplished by an unusual technique for combining carbon black with latex to form an aqueous carbon black-latex slurry. Specifically, it has been found that an aqueous slurry of carbon black and latex, having carbon black present in an amount at least equal to the solids content of the latex and a high total solids content, can be prepared by incorporating in the latex at least one dispersing agent in an amount sufficient to stabilize the synthetic latex against the destabilizing effect of an amount of carbon black at least equal to the solids content of the synthetic latex and thereafter adding dry carbon black to the mixture. It has been found that, in spite of the high concentration of carbon black and the high solids content, a slurry produced in accordance with this technique can be applied to a substrate, such as paper, very readily to produce a coating or film which is extremely uniform in thickness, substantially free of undispersed carbon black and lumps thereof, unusually smooth and of good gloss.

The latexes which may be employed in practicing the method of the present invention are any of the synthetic latexes suitable for use as coating compositions and which are prepared by the aqueous emulsion polymerization of a polymerizable ethylenically unsaturated compound either with itself or with one or more different polymerizable ethylenically unsaturated compounds. Examples of such ethylenically unsaturated compounds are conjugated diolefins such as butadiene-1,3, methyl-2-butadiene 1,3, chloro-2-butadiene 1,3, piperylene, 2,3-dimethyl butadiene-1,3, and the like; aryl olefins, such as styrene, vinyl naphthalene, alpha-methyl styrene, beta-chlorostyrene, vinyl toluene, divinyl benzene and the like; alpha-methylene carboxylic acids, their esters, nitriles and amides, such as acrylic acid, methyl acrylate, methyl methacrylate, acrylonitrile, methacrylonitrile, acrylamide, methylacrylamide and the like; vinyl aliphatic compounds such as the vinyl halides, vinyl acetate, methyl vinyl ether, methyl vinyl ketone and the like; and vinylidene compounds, such as the vinylidene halides.

The subject polymerized latexes are stabilized latexes to the extent that they are stabilized against coagulation or inherent separation during storage or as a result of moderate shearing. While some resistance to coagulation is obtained without additional stabilization other than by the relatively small amounts of emulsifiers initially charged to the polymerization reactor, further stabilization after the initial polymerization is often practiced and is highly desirable. Such further stabilization is generally brought about by the addition of anionic or additional nonionic or mixtures of anionic and nonionic emulsifiers to the latex after about 50% polymerization conversion. This additional stabilization of the latex can, if desired, be entirely or partially affected after polymerization has been completed. Accordingly, when a stabilized latex is referred to in the specification and claims hereof, it is such conventionally stabilized materials which are referred to. It is to be recognized, however, that the dispersing agents added by and in accordance with the present invention are in addition to any emulsifying or dispersing agents or stabilizing agents utilized in the preparation of the synthetic latex itself. It has been found that the addition of large volumes of carbon black to such stabilized synthetic latexes has a destabilizing effect of its own on the latex and, unless this is counteracted, stabilization is impossible and production of a stable slurry, of a viscosity which can be conveniently handled, cannot be attained. While, as previously indicated, slurries having small amounts of carbon black incorporated therein can be prepared with the usual stabilized latexes, slurries having extremely high loadings of carbon black, as in accordance with the present invention, cannot be prepared without the addition of a stabilizing agent sufficient in amount to counteract the destabilizing effect of the high loading of carbon black. Thus, in accordance with the present invention, carbon black is added to latex in amounts equal to or greater than the solids content of the latex itself and additional dispersing agents are, therefore, employed. Such additional dispersing agents may be utilized in amounts within the range of about 1% to about 8% by weight of the total slurry composition, and preferably about 2% to about 6% by weight of the slurry. Again, it is to be noted that these amounts are in addition to the amounts of emulsifier present in the latex as such. While larger amounts of dispersing agent may be employed in the method of the present invention it is usually not necessary to employ such larger amounts. A butadiene-styrene polymer modified with carboxylic acid is a highly desirable latex. A specific polymer can be prepared from 35 to 45 parts by weight of butadiene, 52 to 63 parts by weight of styrene and 1.5 to 3.0 parts by weight of carboxylic acid. This mixture will, of course, be emulsified in water with the aid of a mixture of anionic and nonionic surface active agents as stabilizers. The resultant latex polymer will have a solids content of approximately 48%, a pH of about 9.0 and a particle size in the range of about 0.14 micron. The latex viscosity will be approximately 60 cps. Suitable commercial latexes comprising such terpolymers of styrene, butadiene, and a carboxylic acid include "Dow 630" or "Dow 636" latexes.

The carbon black utilized in accordance with the present invention may be a finely divided loose powder or such powders in pellet form. Carbon blacks particularly suitable for use in the present invention are furnace carbon blacks characterized by a basic pH, usually within the range of about 7.0 to about 11.0. Typical examples of suitable carbon blacks for the present invention, which are generally obtainable in either loose or pellet form, are super abrasion furnace blacks (SAF), high abrasion furnace blacks (HAF), semi-reinforcing carbon blacks, etc. While the furnace blacks having a relatively high pH are preferred, channel blacks typified by general purpose channel, long flow channel, and printing ink channel carbon blacks may also be employed in the present invention.

A combination of dispersing agents found highly suitable for use in accordance with the present method is set forth in detail in co-pending application, Ser. No. 559,414, entitled "Carbon Black-Latex Coating Composition," filed June 22, 1966, by the present inventors. In accordance with the subject application a highly suitable combination of dispersing agents is obtained by mixing a natural gum with a salt-type, anionic surface active agent. Specifically, the highly water-soluble natural gums, such as gum tragacanth, gum acacia and the like may be utilized. Likewise, any of the salt-type anionic surface active agents may be employed, including, preferably alkali and ammonium salts. Surface active agents found highly suitable for use in accordance with the present invention, include, sodium salts of condensed naphthalene sulfonic acids, such as "Tamol SN" and "Tamol N," sold by Rohm & Haas Company; and sodium N-methyl-N-oleoyl taurate "Igepon T-77"; sodium salts of a complex organic phosphate ester "GAFAC LO-529"; sodium salt of a sulfonated naphthalene formaldehyde "Blancol" and dimethylamine sulfonate "Calimulse DMs," all sold by Antara Chemicals, Inc.

In a specific technique for practicing the present invention the gum and the surface active agent are dissolved in a volume of water. The pH of this solution is adjusted to the basic side, suitably between about 8.5 and about 12, by the addition of sodium, potassium or ammonium hydroxide, etc. All of the latex is then added to this solution. The carbon black either as a dry finely divided powder or as dry beads is then added. The mixture is agitated in a blender, by repeated pumping through a centrifugal pump, in a ball mill, in a colloid mill or the like. Preferably, however, a model PB-5A Waring Blendor is utilized at a low speed of about 8000 r.p.m. This blender has a stirrer with four 1.25-inch blades sharpened on their leading edge. The blades are positioned approximately one inch from the bottom of the vessel. Preferably, this mixing is carried out for a period of 10 to 20 minutes. It is also preferred that following the initial mixing the mixture be allowed to stand for a period of roughly 12 to 24 hours, preferably 12 hours. Thereafter, the mixture is again subjected to mixing for a 10 to 20 minute period. The resulting slurry is fluid and readily pourable and therefore can be handled conveniently in the coating of paper. Preferably, the viscosity of the slurry is below about 10,000 cps. and preferably below 2600 cps. immediately after formation. A paper or other substrate may then be coated with the dispersion at the same location or in another location after transportation and storage of the dispersion. The dispersion, as indicated previously, has excellent stability and an air knife, a trailing blade or the like may be used in the coating of paper board or paper. A coating applied to paper will have a very smooth, uniform finish and good gloss. The coated paper will, of course, have a coating thereon of carbon black in an amount at least equal to the solids content of the latex binder. This, of course, will produce outstanding opacity in any use requiring an opaque finish and excellent results in thermographic and electrographic recording papers. In addition, since the initial latex generally has a solids content in the neighborhood of about 30 to 60% by weight, and preferably 50%, and the weight of carbon black at least equals this 30 to 60%, the dispersion will have a total solids content anywhere from about 30 to 60% and preferably between 40 and 50%. With this high solids content the ease of drying the coated paper to a hard finish in a short period of time is enhanced. The resultant coating will obviously contain at least 50% by weight of carbon black with the remainder comprising latex.

EXAMPLE I

By way of specific example, an aqueous slurry of carbon black and latex was prepared according to the following recipe:

| | Grams |
|---|---|
| Water | 100 |
| HAF black beads | 100 |
| Tamol SN (20% solution) | 50 |
| Gum acacia (20% solution) | 50 |
| NaOH (solid) | 0.5 |
| Dow 630 latex (48% solids) | 200 |

The gum acacia and Tamol SN were mixed together with the latex and the water and the pH of the dispersion solution was adjusted to about 10 with sodium hydroxide. This was followed by the carbon black beads. The mixture was then agitated for ten minutes in the Waring Blendor at a speed of about 8000 r.p.m. At the end of the ten minute period the black beads were completely broken down in a semi-fluid dispersion. The viscosity of the slurry, after the ten minute mixing period was about 2880 cps. and after storage for five days was 4800 cps.

A sample of the dispersion was drawn down on paper, the resultant dry coating was smooth with no large particles. The surface had a semi-gloss sheen and there was no rub-off or powdering of the black. The resultant coating comprises about 50% carbon black and 50% latex.

EXAMPLE II

This same procedure was followed to prepare coating materials and to coat paper, utilizing the previously mentioned Igepon T-77, GAFAC LO-529, Blancol and Calimulse DMs in place of the Tamol SN. The results are listed in the following table.

| | Viscosity in cps. after | |
|---|---|---|
| | 10 min. | 5 days |
| Igepon T-77 | 2,920 | 5,200 |
| GAFAC LO-529 | 2,720 | 3,440 |
| Blancol | 1,800 | 3,360 |
| Calimulse DMs | 5,520 | 7,280 |

The coated papers produced with the above solutions had essentially the same appearance and rub resistance as that produced with Tamol SN.

EXAMPLPE III

As previously indicated, the reverse of this procedure did not produce a satisfactory result. Specifically, utilizing exactly the same ingredients as in Example I, the following procedure was carried out. The gum acacia solution was mixed with all of the water and heated to 180° F. When the gum acacia was thoroughly dissolved to form a clear solution, the pH was adjusted to 10 and the Tamol SN solution was added. This solution was then poured into the Waring Blendor and the carbon black was added. The Waring Blendor was operated at low speed (8000 r.p.m.) until all of the carbon black had wet out. After all the carbon black had wet out, the agitation was continued for an additional 10 minutes. This mixture was then allowed to stand overnight, following which the slurry was mixed for an additional 10 minute period in in the Waring Blendor. Thereafter, the mixture was poured into the latex with stirring. The mixture was then poured back into the Waring Blendor to pick up any of the remaining slurry. It is to be noted that the slurry was poured into the latex, rather than the latex into the slurry, in order to avoid local agglomeration. When this solution was made up the mixture was quite fluid. However, after about 20 minutes in the Waring Blendor it was extremely viscous and undoubtedly would have been troublesome to handle if circulated through a pump or allowed to stand in storage.

EXAMPLE IV

In order to compare preparation of carbon black-latex slurries with those of the so-called inert pigments, binders or fillers the procedure of Example I was repeated while substituting 300 grams of zinc oxide for the carbon black in the recipe and also adding 300 grams of zinc oxide in latex alone with the same amount of water. It was found that the viscosities generally varied directly with the amount of solids added and the dispersing agents had no noticeable effect on the mixture. Similar results were obtained utilizing clay as a filler material.

In carrying out the above measurements of viscosity a model RVT Brookfield viscosimeter was utilized. This viscosimeter was operated at 50 r.p.m. utilizing either a No. 3 or No. 4 spindle.

While specific examples have been given herein by way of illustration, it is to be understood that such examples shall not be considered to be limiting and that the present invention is to be limited only in accordance with the appended claims.

We claim:
1. A method of preparing an aqueous slurry of carbon black and synthetic latex comprising: (1) introducing into a stabilized latex, which is prepared by the aqueous emulsion polymerization of a conjugated diolefin with an aryl olefin and which has a solids content of between about 30% and about 60% by weight, at least one dispersing agent, which is obtained by mixing a water-soluble natural gum with a salt-type anionic surface active agent, in addition to any dispersing agent utilized in the preparation of said stabilized latex and in an amount sufficient to stabilize said synthetic latex against the destabilizing effect of an amount of carbon black at least equal to the solids content of said synthetic latex and (2) thereafter adding to said latex-dispersing agent mixture carbon black in dry form in an amount at least equal to the solids content of said latex.

2. A method in accordance with claim 1 wherein the stabilized latex is a terpolymer of styrene, butadiene and carboxylic acid.

3. A method in accordance with claim 1 wherein the dispersing agent introduced is present in an amount between about 1% and about 8% by weight of the total slurry.

4. A method in accordance with claim 1 wherein the mixture is agitated for a period of ten to twenty minutes, the mixture is thereafter permitted to stand for a period of time and the mixture is agitated for a second period of ten to twenty minutes.

5. A method of forming a coated substrate comprising: (1) introducing into a stabilized latex, which is prepared by the aqueous emulsion polymerization of a conjugated diolefin with an aryl olefin and which has a solids content between about 30% and about 60% by weight, at least one dispersing agent, which is obtained by mixing a water-soluble natural gum with a salt-type, anionic surface active agent, in addition to any dispersing agent utilized in the preparation of said stabilized latex and in an amount sufficient to stabilize said synthetic latex against the destabilizing effect of an amount of carbon black at least equal to the solids content of said synthetic latex, (2) adding to said latex-dispersing agent mixture carbon black in dry form in an amount at least equal to the solids content of said latex, (3) forming a thin layer of the resultant mixture on said substrate, and (4) drying said coated substrate to form an adherent coating of said synthetic latex and said carbon black.

6. A method in accordance with claim 5 wherein the stabilized latex is a terpolymer of styrene, butadiene and carboxylic acid.

7. A method in accordance with claim 5 wherein the dispersing agent is present in an amount between about 1% and about 8% by weight of the total slurry.

8. A method in accordance with claim 5 wherein the mixture is agitated for a period of ten to twenty minutes, the mixture is thereafter permitted to stand for a period of time and the mixture is agitated for a second period of ten to twenty minutes.

References Cited

UNITED STATES PATENTS

| | | | |
|---|---|---|---|
| 2,457,542 | 12/1948 | Golden | 260—8 |
| 3,021,226 | 2/1962 | Kraus et al. | 106—238 |
| 3,113,119 | 12/1963 | Forrester | 260—41.5 |
| 2,805,962 | 9/1957 | Hendricks | 117—120 |
| 3,301,799 | 1/1967 | Rothberg et al. | 260—17 |
| 3,360,489 | 12/1967 | Grossman et al. | 260—23 |
| 2,998,400 | 8/1961 | French | 260—29.6 |

OTHER REFERENCES

Noble, "Latex in Industry," 2nd ed., Palmerton Publishing Co., 1953, p. 232.

Noble, "Latex in Industry," 2nd ed., 1953, Palmerton Publishing Co., TS1890, N75.

WILLIAM H. SHORT, Primary Examiner

E. A. NIELSEN, Assistant Examiner

U.S. Cl. X.R.

117—34, 155, 161; 260—29.7, 41.5